United States Patent

Parinas et al.

(10) Patent No.: US 10,982,625 B2
(45) Date of Patent: Apr. 20, 2021

(54) INTEGRAL VARIABLE PERFORMANCE PROPELLANT GRAIN

(71) Applicant: GOODRICH CORPORATION, Charlotte, NC (US)

(72) Inventors: Paul Parinas, Roseville, CA (US); Brian Wilson, Vacaville, CA (US)

(73) Assignee: Goodrich Corporation, Charlotte, NC (US)

( * ) Notice: Subject to any disclaimer, the term of this patent is extended or adjusted under 35 U.S.C. 154(b) by 180 days.

(21) Appl. No.: 16/056,293

(22) Filed: Aug. 6, 2018

(65) Prior Publication Data

US 2020/0040849 A1 Feb. 6, 2020

(51) Int. Cl.
*F02K 9/12* (2006.01)
*F02K 9/28* (2006.01)
*C06B 31/30* (2006.01)
*C06B 29/22* (2006.01)
*F02K 9/22* (2006.01)

(52) U.S. Cl.
CPC .............. *F02K 9/12* (2013.01); *C06B 29/22* (2013.01); *C06B 31/30* (2013.01); *F02K 9/22* (2013.01); *F02K 9/28* (2013.01); *F05D 2220/80* (2013.01)

(58) Field of Classification Search
CPC ..... F02K 9/08; F02K 9/10; F02K 9/12; F02K 9/28; B64G 1/403
See application file for complete search history.

(56) References Cited

U.S. PATENT DOCUMENTS 3,089,418 A * 5/1963 Stiefel .................. F02K 9/28
  102/531
4,357,795 A   11/1982 Bastian et al.
2018/0156158 A1  6/2018 Lynch et al.

FOREIGN PATENT DOCUMENTS

FR    2742483 A1 * 6/1997 .............. F02K 9/12
WO    2001038711   5/2001

OTHER PUBLICATIONS

Nugeyre, Description FR 2742483 Translation, 1997, Espacenet (Year: 1997).*

* cited by examiner

*Primary Examiner* — Todd E Manahan
*Assistant Examiner* — Kyle Robert Thomas
(74) *Attorney, Agent, or Firm* — Snell & Wilmer L.L.P.

(57) ABSTRACT

A solid propellant rocket motor may comprise a core-burning propellant grain extending along a longitudinal axis of the solid propellant rocket motor between an exhaust end of the solid propellant rocket motor and a forward end of the solid propellant rocket motor, a first burn inhibitor layer surrounding the core-burning propellant grain, an end-burning propellant grain surrounding the first burn inhibitor layer, a second burn inhibitor layer surrounding the end-burning propellant grain, and an aperture at least partially defined by the first burn inhibitor layer. The end-burning propellant grain is ignited by the core-burning propellant grain via the aperture.

17 Claims, 3 Drawing Sheets

INTEGRAL VARIABLE PERFORMANCE PROPELLANT GRAIN

FIELD

The present disclosure relates generally to solid fuel rocket propulsion systems, and more particularly, to systems and methods for variable performance rocket motor propellants.

BACKGROUND

Solid propellant rocket motors may include a solid propellant grain material that is cast around a core. The core is then removed by sliding it out from the cast grain material, leaving an open central bore, sometimes referred to as a hollow core or center perforated (CP) core motor design. Ignition at the bore surface of the solid propellant generates high pressure gas, which is expelled from the bore through a nozzle to generate thrust.

SUMMARY

A solid propellant rocket motor may comprise a core-burning propellant grain extending along a longitudinal axis of the solid propellant rocket motor between an exhaust end of the solid propellant rocket motor and a forward end of the solid propellant rocket motor, a first burn inhibitor layer surrounding the core-burning propellant grain, an end-burning propellant grain surrounding the first burn inhibitor layer, a second burn inhibitor layer surrounding the end-burning propellant grain, and an aperture at least partially defined by the first burn inhibitor layer, wherein the end-burning propellant grain is ignited by the core-burning propellant grain via the aperture.

In various embodiments, the core-burning propellant grain defines a center perforation extending longitudinally through the solid propellant rocket motor.

In various embodiments, an exhaust gas generated by the end-burning propellant grain exits the solid propellant rocket motor via the aperture.

In various embodiments, the core-burning propellant grain is disposed in a first chamber defined by the first burn inhibitor layer, the end-burning propellant grain is disposed in a second chamber defined between the first burning inhibiting layer and the second burning inhibiting layer, and the first chamber is in fluid communication with the second chamber via the aperture.

In various embodiments, the first burn inhibitor layer is concentric with the second burn inhibitor layer.

In various embodiments, the core-burning propellant grain is concentric with the end-burning propellant grain.

In various embodiments, the aperture is disposed at the exhaust end.

In various embodiments, a burn front of the core-burning propellant grain travels radially outward and a burn front of the end-burning propellant grain travels longitudinally in the direction of the forward end.

A method for manufacturing a solid propellant rocket motor is disclosed comprising disposing a core-burning propellant grain in a first chamber at least partially defined by a first burn inhibitor layer, disposing an end-burning propellant grain in a second chamber at least partially defined by a second burn inhibitor layer, and disposing the first chamber to be in fluid communication with the second chamber via an aperture, the solid propellant rocket motor configured such that the end-burning propellant grain is ignited by the core-burning propellant grain via the aperture.

In various embodiments, the method further comprises disposing the aperture at an exhaust end of the solid propellant rocket motor.

In various embodiments, an exhaust gas generated by the end-burning propellant grain exits the solid propellant rocket motor via the aperture.

In various embodiments, the second chamber is defined between the first burn inhibitor layer and the second burn inhibitor layer.

In various embodiments, the aperture is at least partially defined by the first burn inhibitor layer.

A solid propellant rocket motor is disclosed, comprising a first burn inhibitor layer defining a first chamber, a core-burning propellant grain disposed in the first chamber, a second burn inhibitor layer defining a second chamber, an end-burning propellant grain disposed in the second chamber, and an aperture, whereby the first chamber is in fluid communication with the second chamber, wherein the end-burning propellant grain is ignited by the core-burning propellant grain via the aperture.

In various embodiments, the core-burning propellant grain defines a center perforation extending longitudinally through the solid propellant rocket motor.

In various embodiments, an exhaust gas generated by the end-burning propellant grain exits the solid propellant rocket motor via the aperture.

In various embodiments, the solid propellant rocket motor further comprises an ignitor configured to ignite the core-burning propellant grain.

In various embodiments, the first burn inhibitor layer is concentric with the second burn inhibitor layer.

In various embodiments, the core-burning propellant grain is concentric with the end-burning propellant grain.

In various embodiments, the aperture is disposed at an exhaust end of the solid propellant rocket motor.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

The present disclosure provides a solid fuel rocket motor in a hybrid core-burning and end-burning configuration which is capable of variable thrusts during the course of the rocket motor's flight. Core-burning configuration, as that term is used herein, means a rocket motor utilizing a propellant grain in which the burning front progresses substantially from the hollow core of the propellant grain radially outward toward the outer surface of the propellant grain. End-burning configuration, as that term is used herein, means a rocket motor utilizing a propellant grain in which the burning front progresses substantially from the exhaust end of the motor toward the front end of the motor. Rocket motors with variable thrusts are desirable because they can achieve thrust profiles which are optimized for the entire flight. For example, while rocket motors require large thrusts at the initial period of flight to achieve lift-off, they require less thrust at later periods of flight. This reduction of required thrust is due to the changing mass of the rocket motor during the course of its flight. The weight of the rocket motor is at a maximum at the start of its flight, because it contains all the propellant to be used over the whole flight. But once the flight begins, the propellant starts to be consumed and expelled to produce the needed thrust. Since acceleration is equal to force divided by mass, as the mass of the rocket motor decreases, the acceleration from a constant propulsion force increases. If the thrust is not reduced at later periods of the rocket's flight, the acceleration may increase to a magnitude which damages the payload, or other elements of the rocket.

Figure 1A:
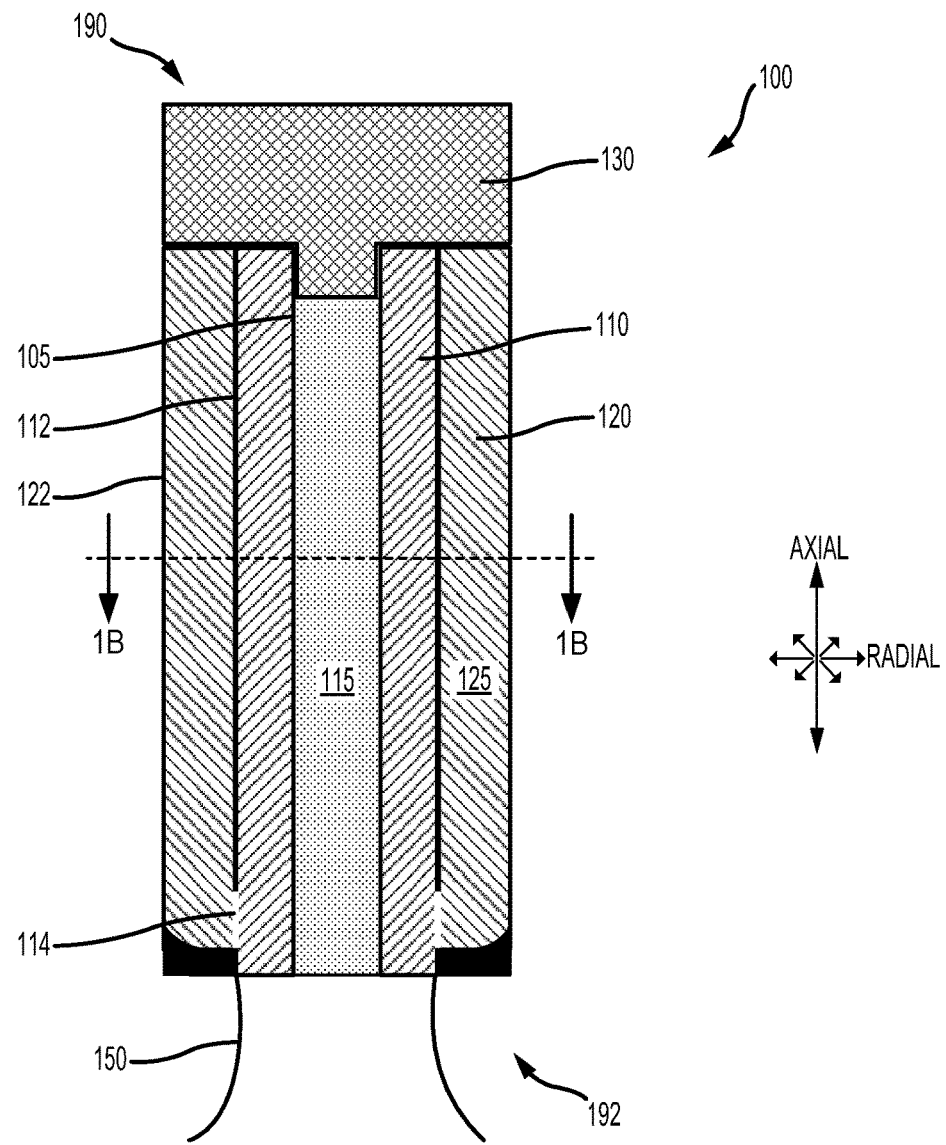
FIG. 1A illustrates a schematic view of a solid rocket motor having a variable parameter propellant grain, in accordance with various embodiments.

With reference to FIG. 1A, a solid propellant rocket motor 100 is illustrated, in accordance with various embodiments. Solid propellant rocket motor 100 may comprise a forward end 190 and an exhaust end 192. Solid propellant rocket motor 100 may comprise a core-burning propellant grain 110 extending along a longitudinal axis of the solid propellant rocket motor 100 between the exhaust end 192 and the forward end 190. Along the center axis of core-burning propellant grain 110 is a cylindrical hollow core region, referred to herein as a center perforation 105, at least partially containing an ignitor 130, in accordance with various embodiments. Center perforation 105 may define a bore extending longitudinally through core-burning propellant grain 110. Solid propellant rocket motor 100 may comprise a first burn inhibitor layer 112 surrounding the core-burning propellant grain 110. Solid propellant rocket motor 100 may comprise an end-burning propellant grain 120 surrounding the first burn inhibitor layer 112. Solid propellant rocket motor 100 may comprise a second burn inhibitor layer 122 surrounding the end-burning propellant grain 120. Solid propellant rocket motor 100 may comprise an aperture 114 at least partially defined by the first burn inhibitor layer 112. Solid propellant rocket motor 100 may comprise ignitor 130 disposed at forward end 190. Ignitor 130 may be at least partially disposed in center perforation 105. Ignitor 130 may be configured to ignite core-burning propellant grain 110. It should be noted, at this point, that the ignitor 130 is shown schematically, and the electrical connections have not been shown. The particular ignitor and electrical connections are well known in the art and can be selected in accordance with the particular propellant/oxidizer utilized, and other desired design features.

Forward end 190 of solid propellant rocket motor 100 may be sealed and exhaust end 192 may be terminated by a nozzle structure 150. Upon ignition by ignitor 130, the inner surface of core-burning propellant grain 110—i.e. center perforation 105—begins burning, thereby becoming the burn front, which is the surface of the propellant grain being combusted or burned at any given time. The burning then continues, with the burn front propagating radially outward from the hollow core, yielding gaseous combustion by-products at high temperature and pressure. The expulsion of these gaseous combustion by-products through the nozzle structure 150 provides the thrust of the solid propellant rocket motor 100. Consumption of core-burning propellant grain 110 continues until the burn front reaches the first burn inhibitor layer 112 and the core-burning propellant grain 110 is depleted. Upon reaching the first burn inhibitor layer 112, the burn front of core-burning propellant grain 110 ignites the aft end of end-burning propellant grain 120 through aperture 114. In this regard, upon depletion of core-burning propellant grain 110, end-burning propellant grain 120 is ignited. Upon ignition by core-burning propellant grain 110, the exhaust end of end-burning propellant grain 120 begins burning, thereby becoming the burn front. The burning then continues, with the burn front propagating longitudinally forward from the exhaust end, yielding gaseous combustion by-products at high temperature and pressure. The expulsion of these gaseous combustion by-products through the nozzle structure 150 provides the thrust of the solid propellant rocket motor 100. Consumption of end-burning propellant grain 120 continues until the burn front reaches the forward end of second burn inhibitor layer 122 and end-burning propellant grain 120 is depleted.

In various embodiments, aperture 114 is both the aperture by which core-burning propellant grain 110 ignites end-burning propellant grain 120, as well as the aperture through which gaseous combustion by-products of end-burning propellant grain 120 are expulsed. In this regard, a simple solid rocket motor propellant design is provided, allowing for weight savings, in particular when compared with other more complex rocket motor propellant designs. Furthermore, solid propellant rocket motor 100 provides a variable performance propellant design. In various embodiments, a first phase of the propellant grain combustion (e.g., combustion of core-burning propellant grain 110) may provide a relatively higher pressure burn for a relatively shorter duration and a second phase of the propellant grain combustion (e.g., combustion of end-burning propellant grain 120) may provide a relatively lower pressure burn for a relatively longer duration. For example, solid propellant rocket motor 100 provide fast, high thrust ignition via core-burning propellant grain 110, followed by slow and steady thrust via end-burning propellant grain 120. Such a design may be particularly useful for rockets that unlock and/or break restraints and then jettison from a larger flight vehicle. However, any suitable variable performance propellant burn phases may be realized using the disclosed propellant grain design depending on the desired performance parameters based on a mission profile.

Figure 1B:
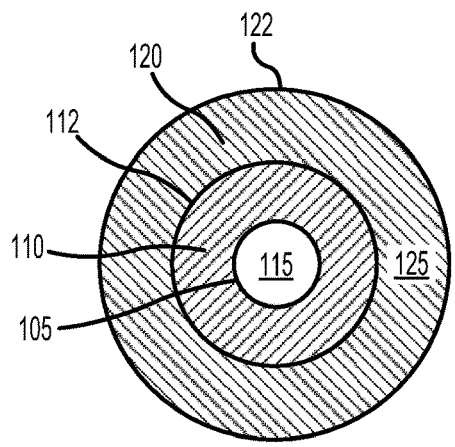
FIG. 1B illustrates a cross section view of the solid rocket motor of FIG. 1A, in accordance with various embodiments.

With combined reference to FIG. 1A and FIG. 1B, first burn inhibitor layer 112 may define a first chamber 115 therein. Core-burning propellant grain may be disposed in first chamber 115. A second chamber 125 may be defined between first burn inhibitor layer 112 and second burn inhibitor layer 122. End-burning propellant grain 120 may be disposed in second chamber 125. First chamber 115 may be in fluid communication with second chamber 125 via aperture 114.

In various embodiments, first burn inhibitor layer 112 may be concentric with second burn inhibitor layer 122. In this regard, core-burning propellant grain 110 may be concentric with end-burning propellant grain 120.

In various embodiments, core-burning propellant grain 110 and/or end burning propellant grain 120 may be comprised of a composite propellant comprising both a fuel and an oxidizer mixed and immobilized within a cured polymer-based binder. For example, core-burning propellant grain 110 and/or end burning propellant grain 120 may comprise an ammonium nitrate-based composite propellant (ANCP) or ammonium perchlorate-based composite propellant (APCP). In various embodiments, core-burning propellant grain 110 and/or end burning propellant grain 120 may comprise a distribution of AP ($NH_4ClO_4$) grains embedded in a hydroxyl-terminated polybutadiene (HTPB) matrix.

Figure 2:
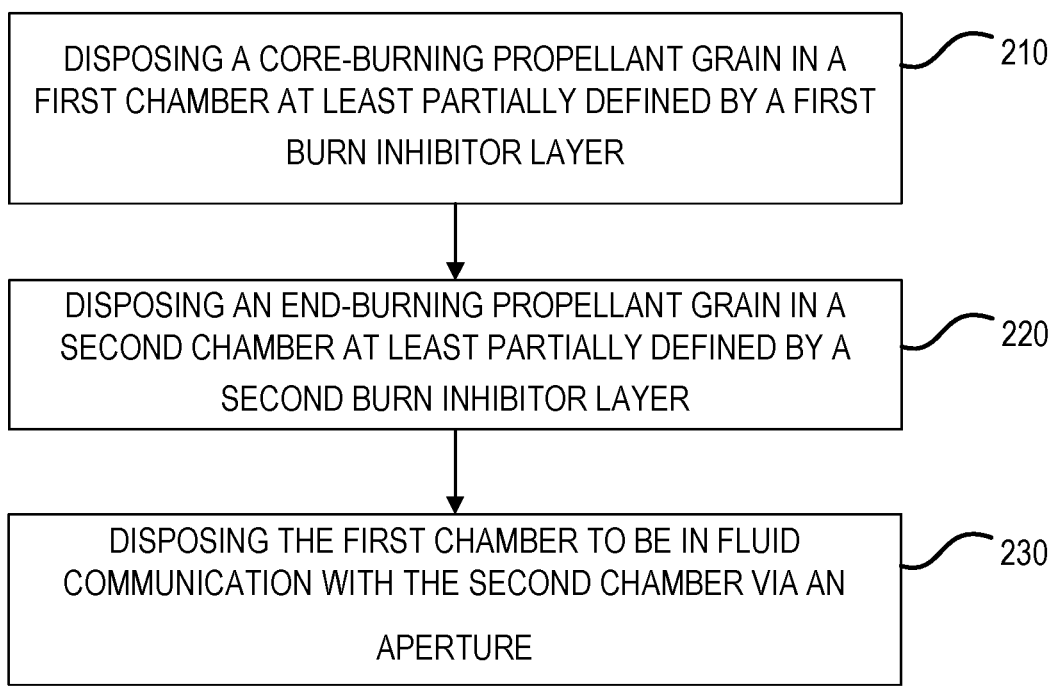
FIG. 2 illustrates a method for manufacturing a solid fuel rocket motor, in accordance with various embodiments.

With reference to FIG. 2, a flow chart illustrating a method 200 for manufacturing a solid propellant rocket motor is disclosed, in accordance with various embodiments. Method 200 includes disposing a core-burning propellant grain in a first chamber at least partially defined by a first burn inhibitor layer (step 210). Method 200 includes disposing an end-burning propellant grain in a second chamber at least partially defined by a second burn inhibitor layer (step 220). Method 200 includes disposing the first chamber to be in fluid communication with the second chamber via an aperture (step 230).

With combined reference to FIG. 1A and FIG. 2, step 210 may include disposing core-burning propellant grain 110 in first chamber 115. Step 220 may include disposing end-burning propellant grain 120 in second chamber 125. Step 230 may include disposing first chamber 115 to be in fluid communication with the second chamber 125 via aperture 114.

In various embodiments, first burn inhibitor layer 112 and/or second burn inhibitor layer 122 may be formed from a metal material, such as aluminum, among other metal materials. First burn inhibitor layer 112 and/or second burn inhibitor layer 122 may be cylindrical.

Figure 3:
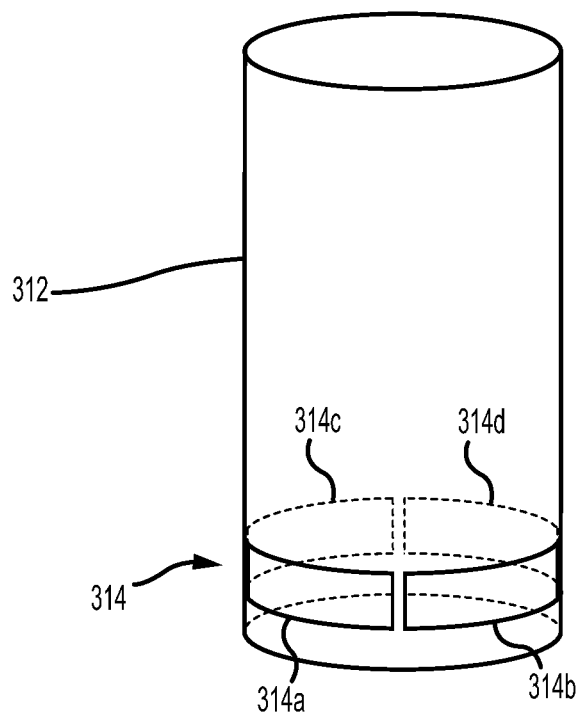
FIG. 3 illustrates a perspective view of a first burn inhibitor layer defining a segmented aperture, in accordance with various embodiments.

With reference to FIG. 3, a first burn inhibitor layer 312 defining a plurality of apertures 314 is illustrated, in accordance with various embodiments. In various embodiments, first burn inhibitor layer 112 of FIG. 1A may be similar to first burn inhibitor layer 312. The illustrated embodiment shows four apertures 314 including aperture 314a, aperture 314b, aperture 314c, and aperture 314d formed as a segmented ring around first burn inhibitor layer 312. Although illustrated as having four apertures 314, it is contemplated that any number of apertures may be provided. The total combined area of the apertures 314 may be tailored according to a desired mass flow rate of combustion gas produced by the end-burning propellant grain 120, with momentary reference to FIG. 1A.

Figure 4:
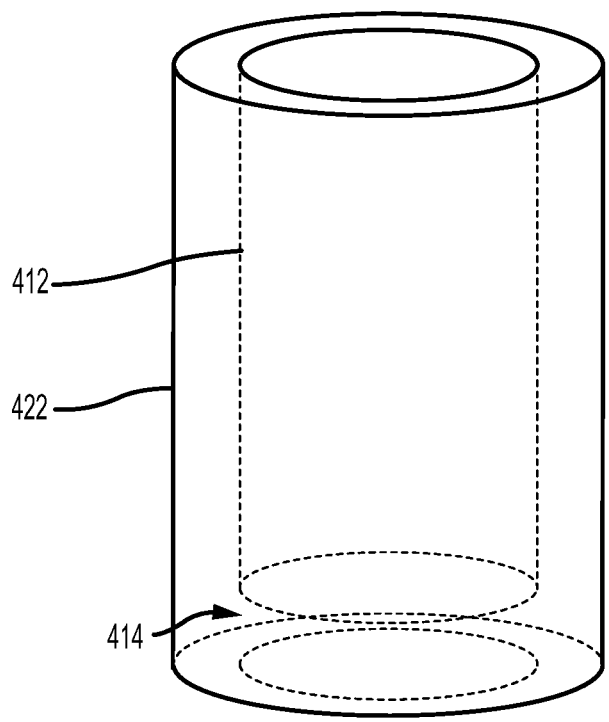
FIG. 4 illustrates a perspective view of a first burn inhibitor layer and a second burn inhibitor layer defining an aperture, in accordance with various embodiments.

With reference to FIG. 4, a first burn inhibitor layer 412 and a second burn inhibitor layer 422 defining an aperture 414 is illustrated, in accordance with various embodiments. In various embodiments, first burn inhibitor layer 112 and second burn inhibitor layer 122 of FIG. 1A may be similar to first burn inhibitor layer 412 and second burn inhibitor layer 422, respectively. In various embodiments, aperture 414 may be defined between an exhaust end of first burn inhibitor layer 412 and an exhaust end of second burn inhibitor layer 422.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A solid propellant rocket motor, comprising:
   a core-burning propellant grain extending along a longitudinal axis of the solid propellant rocket motor between an exhaust end of the solid propellant rocket motor and a forward end of the solid propellant rocket motor;
   a first burn inhibitor layer surrounding the core-burning propellant grain;
   an end-burning propellant grain surrounding the first burn inhibitor layer;
   a second burn inhibitor layer surrounding the end-burning propellant grain; and
   an aperture at least partially defined by the first burn inhibitor layer;
   wherein the end-burning propellant grain is ignited by the core-burning propellant grain via the aperture,
   an exhaust gas generated by the end-burning propellant grain is configured to be expulsed radially through the aperture; and
   wherein the aperture is disposed at the exhaust end of the solid propellant rocket motor.

2. The solid propellant rocket motor of claim 1, wherein the core-burning propellant grain defines a center perforation extending longitudinally through the solid propellant rocket motor.

3. The solid propellant rocket motor of claim 1, wherein the exhaust gas generated by the end-burning propellant grain exits the solid propellant rocket motor via the aperture, and the aperture is radially facing.

4. The solid propellant rocket motor of claim 1, wherein the core-burning propellant grain is disposed in a first chamber defined by the first burn inhibitor layer, the end-burning propellant grain is disposed in a second chamber defined between the first burning inhibiting layer and the second burning inhibiting layer, and the first chamber is in fluid communication with the second chamber via the aperture.

5. The solid propellant rocket motor of claim 1, wherein the first burn inhibitor layer is concentric with the second burn inhibitor layer.

6. The solid propellant rocket motor of claim 5, wherein the core-burning propellant grain is concentric with the end-burning propellant grain.

7. The solid propellant rocket motor of claim 1, wherein a burn front of the core-burning propellant grain travels radially outward and a burn front of the end-burning propellant grain travels longitudinally in the direction of the forward end.

8. A method for manufacturing a solid propellant rocket motor, comprising:
   disposing a core-burning propellant grain in a first chamber at least partially defined by a first burn inhibitor layer;
   disposing an end-burning propellant grain in a second chamber at least partially defined by a second burn inhibitor layer; and
   disposing the first chamber to be in fluid communication with the second chamber via an aperture;
   disposing the aperture at an exhaust end of the solid propellant rocket motor;
   the solid propellant rocket motor configured such that the end-burning propellant grain is configured to be ignited by the core-burning propellant grain via the aperture,
   an exhaust gas generated by the end-burning propellant grain is configured to be expulsed radially through the aperture.

9. The method of claim 8, wherein the exhaust gas generated by the end-burning propellant grain exits the solid propellant rocket motor via the aperture.

10. The method of claim 9, wherein the second chamber is defined between the first burn inhibitor layer and the second burn inhibitor layer.

11. The method of claim 10, wherein the aperture is at least partially defined by the first burn inhibitor layer.

12. A solid propellant rocket motor, comprising:
    a first burn inhibitor layer defining a first chamber;
    a core-burning propellant grain disposed in the first chamber;
    a second burn inhibitor layer defining a second chamber;
    an end-burning propellant grain disposed in the second chamber; and
    an aperture, whereby the first chamber is in fluid communication with the second chamber;
    wherein the end-burning propellant grain is configured to be ignited by the core-burning propellant grain via the aperture,
    an exhaust gas generated by the end-burning propellant grain is configured to be expulsed radially through the aperture; and
    wherein the aperture is disposed at an exhaust end of the solid propellant rocket motor.

13. The solid propellant rocket motor of claim 12, wherein the core-burning propellant grain defines a center perforation extending longitudinally through the solid propellant rocket motor.

14. The solid propellant rocket motor of claim 13, wherein the exhaust gas generated by the end-burning propellant grain exits the solid propellant rocket motor via the aperture.

15. The solid propellant rocket motor of claim 13, further comprising an ignitor configured to ignite the core-burning propellant grain.

16. The solid propellant rocket motor of claim 13, wherein the first burn inhibitor layer is concentric with the second burn inhibitor layer.

17. The solid propellant rocket motor of claim 16, wherein the core-burning propellant grain is concentric with the end-burning propellant grain.

* * * * *